(12) United States Patent
Shaw et al.

(10) Patent No.: US 8,602,189 B2
(45) Date of Patent: Dec. 10, 2013

(54) DIECAST COUPLING MEMBER FOR USE IN AN ENGAGEABLE COUPLING ASSEMBLY

(75) Inventors: David W. Shaw, Saginaw, MI (US); Stephen M. Ruth, Holly, MI (US); Jeffrey J. Prout, Freeland, MI (US)

(73) Assignee: Means Industries, Inc., Saginaw, MI (US)

( * ) Notice: Subject to any disclaimer, the term of this patent is extended or adjusted under 35 U.S.C. 154(b) by 446 days.

(21) Appl. No.: 12/956,110

(22) Filed: Nov. 30, 2010

(65) Prior Publication Data

US 2011/0214962 A1 Sep. 8, 2011

Related U.S. Application Data

(60) Provisional application No. 61/311,033, filed on Mar. 5, 2010.

(51) Int. Cl.
*F16D 41/12* (2006.01)

(52) U.S. Cl.
USPC .......... 192/46; 192/69.1; 192/107 M; 192/108

(58) Field of Classification Search
None
See application file for complete search history.

(56) References Cited

U.S. PATENT DOCUMENTS

| | | | |
|---|---|---|---|
| 4,679,681 A | 7/1987 | Creydt et al. | |
| 5,597,057 A | 1/1997 | Ruth et al. | |
| 5,918,715 A | 7/1999 | Ruth et al. | |
| 6,125,980 A * | 10/2000 | Ruth et al. | 192/46 |
| 6,333,112 B1 | 12/2001 | Field et al. | |
| 6,373,157 B1 * | 4/2002 | Sekine | 192/46 |
| 6,557,681 B2 * | 5/2003 | Kinoshita et al. | 192/46 |
| 6,577,033 B1 * | 6/2003 | Sekine | 192/46 |
| 2005/0279602 A1 | 12/2005 | Ruth | |
| 2006/0231366 A1 | 10/2006 | Meggiolan | |
| 2008/0095654 A1 * | 4/2008 | Engquist et al. | 419/25 |
| 2008/0135369 A1 | 6/2008 | Meier | |

FOREIGN PATENT DOCUMENTS

WO 2008103683 A1 8/2008

OTHER PUBLICATIONS

International Search Report and Written Opinion; International application No. PCT/US2012/039237; International filing date May 24, 2012; date of mailing Aug. 7, 2012.
International Preliminary Report on Patentability; International application No. PCT/US2011/026832; date of issuance Sep. 11, 2012.
International Search Report and Written Opinion; International Application No. PCT/US2011/026832; mailed May 3, 2011.
Office Action from the U.S. Patent and Trademark Office; corresponding U.S. Appl. No. 13/150,522; date of mailing Aug. 6, 2013.

* cited by examiner

*Primary Examiner* — Rodney Bonck
(74) *Attorney, Agent, or Firm* — Brooks Kushman P.C.

(57) ABSTRACT

A diecast pocket plate or member having a sacrificial surface layer or portion is provided. The member is formed as a unitary die-casting from a die-casting alloy strengthened by an alloying material in a die-casting process. The diecast member includes a coupling face having a pocket which is sized and shaped to receive and nominally retain a locking member that moves in the pocket during an overrun condition of an engageable coupling assembly. The diecast member also includes a relatively hard base portion including particles of the strengthening alloying material of the die-casting alloy. The diecast member further includes a plurality of surface portions which define the pocket. At least one generally vertical surface portion of the surface portions is soft relative to the hard base portion and is substantially devoid of the particles of the alloying material so that the at least one generally vertical surface portion wears or deforms (i.e., is sacrificial) during contact of the locking member against the at least one generally vertical surface portion during the overrun condition.

33 Claims, 6 Drawing Sheets

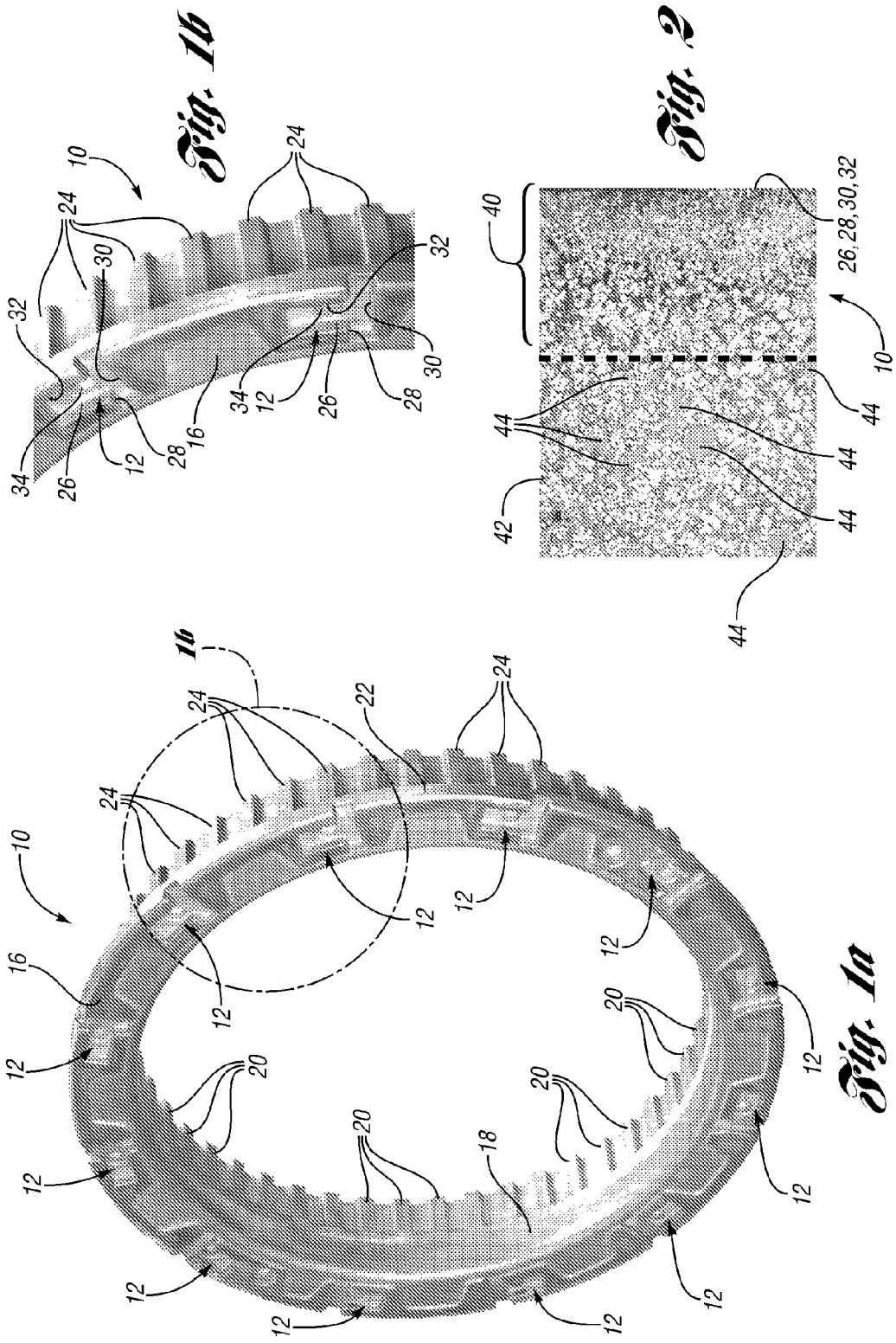

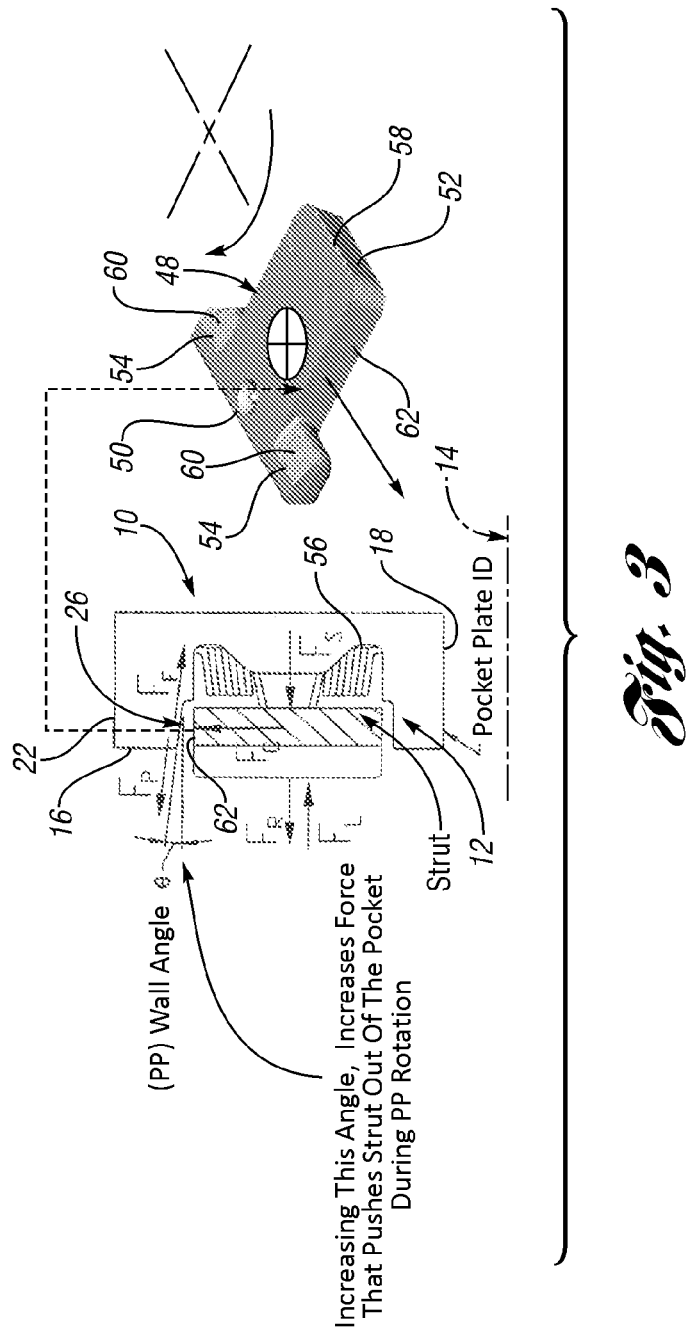

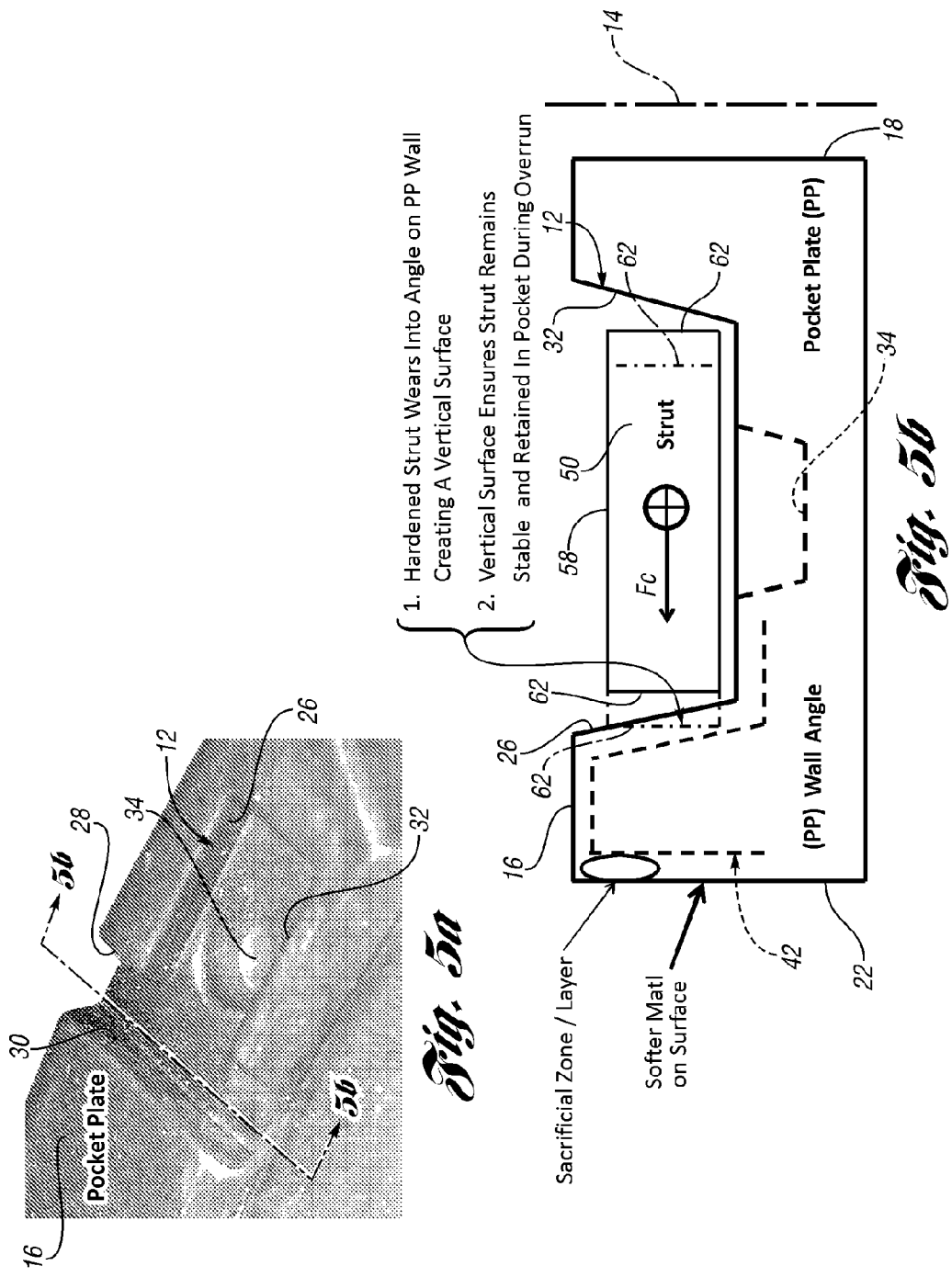

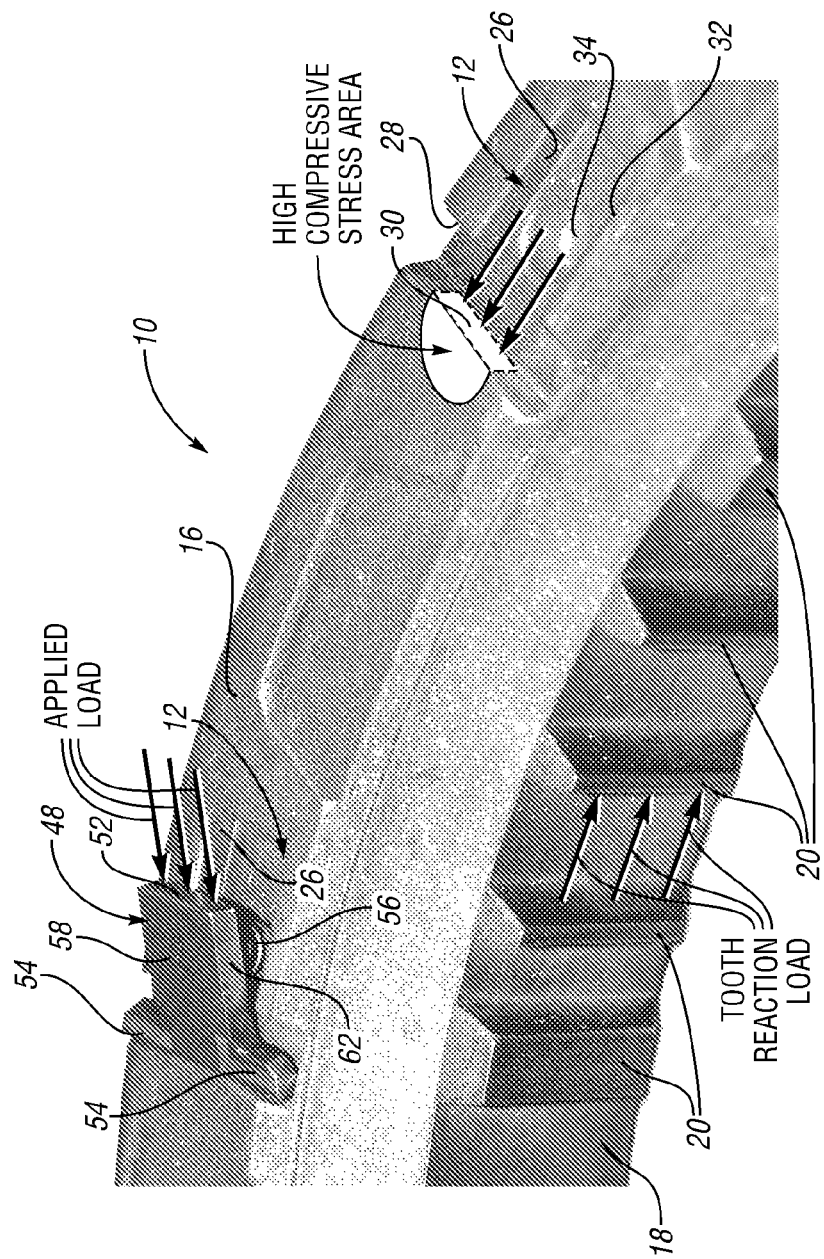

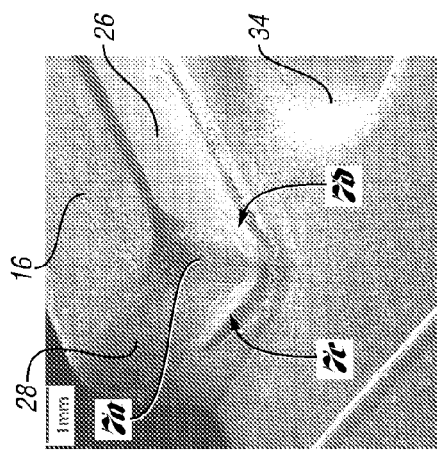
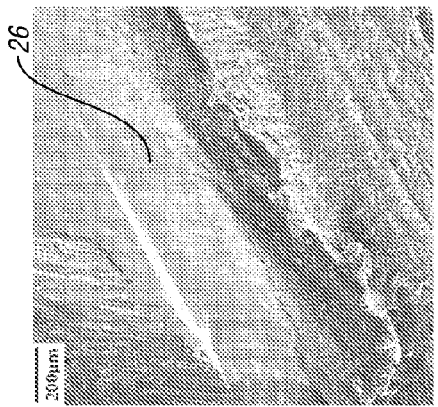
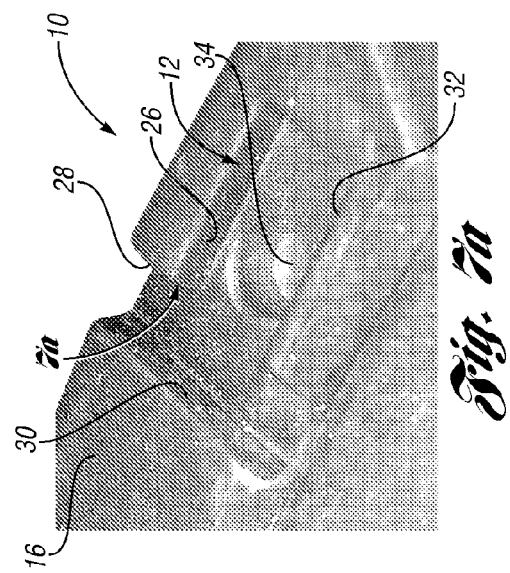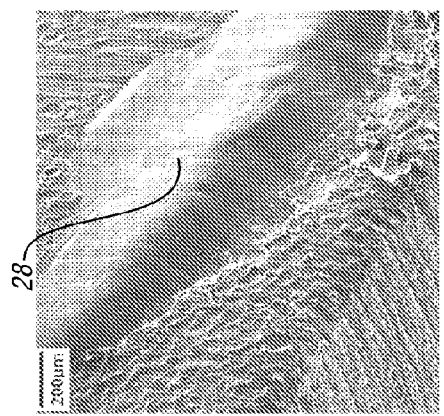

DIECAST COUPLING MEMBER FOR USE IN AN ENGAGEABLE COUPLING ASSEMBLY

CROSS-REFERENCE TO RELATED APPLICATION

This application claims the benefit of U.S. provisional patent application entitled "POCKET PLATE HAVING A SACRIFICIAL SURFACE LAYER FOR USE IN ONE-WAY RATCHETING TYPE COUPLING OR CLUTCH ASSEMBLIES" filed on Mar. 5, 2010, and having U.S. Ser. No. 61/311,033.

BACKGROUND OF THE INVENTION

1. Field of the Invention

This invention relates to diecast coupling members such as pocket plates for use in engageable coupling assemblies such as one-way clutch assemblies.

2. Background Art

Pocket plates or members for use in one-way ratcheting type coupling or clutch assemblies are typically formed using powdered ferrous metals. In contrast to other metal-forming techniques, powdered metal parts are shaped directly from powder, whereas castings originate from molten metal.

Other methods of forming pocket plates have been tried in an attempt to reduce cost. For example, U.S. Pat. No. 6,333,112 discloses a laminated pocket plate. U.S. Patent Publication No. 2008/0135369 discloses a stamped clutch pocket plate. U.S. Pat. No. 6,125,980 discloses a pocket plate integrated within a hub such as by casting or molding to form an integral assembly. The hub comprises an aluminum alloy casting or a phenolic molding. The pocket plate itself is preferably a powdered metal part.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY

An object of at least one embodiment of the present invention is to provide a diecast coupling member for use in an engageable coupling assembly wherein the member has at least one generally vertical sacrificial surface portion.

In carrying out the above object and other objects of at least one embodiment of the present invention, a coupling member for an engageable coupling assembly is provided. The coupling member is formed as a unitary die-casting from a die-casting alloy strengthened by an alloying material in a die casting process. The coupling member includes a coupling face having a pocket which is sized and shaped to receive and nominally retain a locking member that moves in the pocket during an overrun condition of the assembly. The coupling member also includes a relatively hard base portion including particles of the strengthening alloying material of the die-casting alloy. The coupling member further includes a plurality of surface portions which define the pocket. At least one generally vertical surface portion of the surface portions is soft relative to the hard base portion and is substantially devoid of the particles of the alloying material so that the at least one generally vertical surface portion wears or deforms during contact of the locking member against the at least one generally vertical surface portion during the overrun condition.

The strengthening alloying material may include at least one of elemental Si, Cu, Mg, Ni and Zn.

The at least one generally vertical surface portion may include at least one of an outboard edge surface, an inside corner surface, a head edge surface and an inboard edge surface.

The wear may be at least one of abrasive-type wear and polishing-type wear.

The die casting alloy may be a non-ferrous alloy.

The coupling member may be a pocket plate.

The locking member may be a locking strut.

The coupling face may be an annular coupling face.

The coupling face may have a plurality of pockets. Each of the pockets may be sized and shaped to receive and nominally retain a corresponding locking member.

The coupling member may be a clutch member.

The pocket may have a T-shape and the pocket may have an inner recess for receiving a biasing spring such that the pocket is a spring pocket.

The annular coupling face may be oriented to face axially along a rotational axis of the assembly or the annular coupling face may be oriented to face radially with respect to the rotational axis.

Further in carrying out the above object and other objects of the at least one embodiment of the present invention, a pocket plate for a one-way clutch assembly is provided. The pocket plate is formed as a unitary die-casting from a die-casting alloy strengthened by an alloying material in a die casting process. The pocket plate includes an annular coupling face having a pocket which is sized and shaped to receive and nominally retain a locking strut that moves in the pocket during an overrun condition of the assembly. The plate also includes a relatively hard base portion including particles of strengthening alloying material of the die-casting alloy. The plate further includes a plurality of surface portions which define the pocket. At least one generally vertical surface portion of the surface portions is soft relative to the hard base portion and is substantially devoid of the particles of the alloying material so that the at least one generally vertical surface portion wears or deforms during contact of the locking strut against the at least one generally vertical surface portion during the overrun condition.

The coupling face may have a plurality of pockets. Each of the pockets may be sized and shaped to receive and nominally retain a corresponding locking strut.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1a is a perspective, photorealistic view of an overrunning pocket plate or member of a one-way clutch or coupling assembly (not shown) constructed in accordance with at least one embodiment of the present invention;

FIG. 1b is an enlarged perspective photorealistic view, partially broken away, taken within the circle labeled 1b in FIG. 1a;

FIG. 2 is a metallographic sectional view of an outer surface portion of the cast pocket plate;

FIG. 3 includes a schematic perspective view of a strut or pawl together with a sectional view of the strut received and nominally retained within one of the pockets of the pocket plate;

FIG. 5a is a view of the pocket plate similar to the view of FIG. 4b;

FIG. 5b is a side schematic view taken along lines 5b-5b of FIG. 5a and illustrating the pocket of the pocket plate;

FIG. 6 is yet another photorealistic view, partially broken away, illustrating: a tooth reaction load on the splines of the pocket plate;

FIG. 7a is a view similar to the view of FIGS. 4b and 5a after the strut has worn the various sacrificial layers defining surfaces of the pocket;

FIG. 7b is an electron microscopic image which includes the surfaces of FIG. 7a;

FIG. 7c is an enlarged view indicated by the notation "7c" in FIG. 7b; and

FIG. 7d is an enlarged view indicated by the notation "7d" in FIG. 7b.

DETAILED DESCRIPTION OF EXAMPLE EMBODIMENTS(S)

Figure 4B:
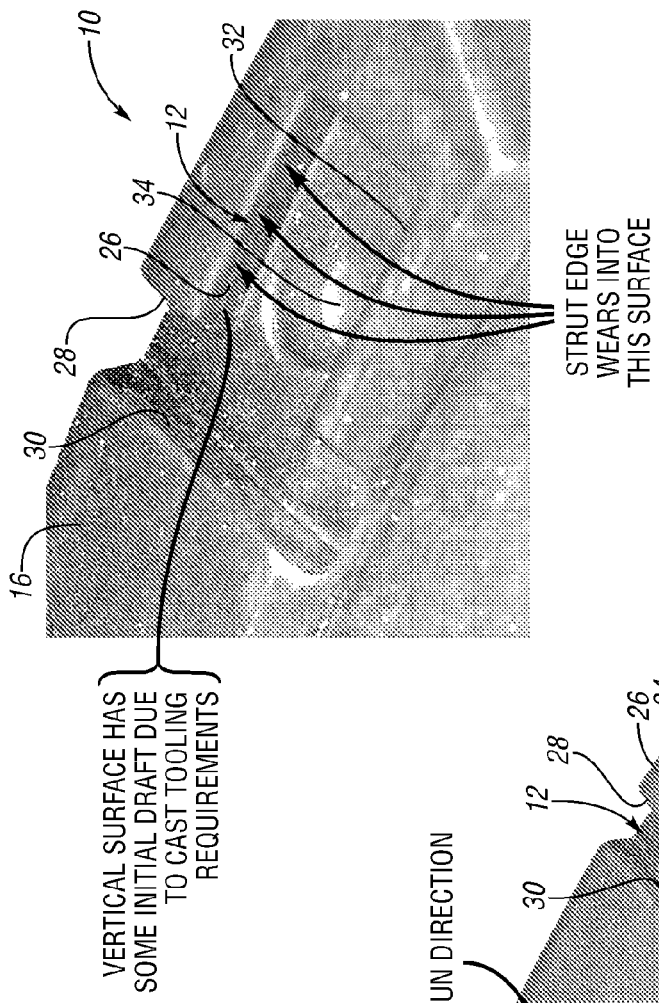
FIG. 4b is an enlarged perspective photorealistic view, partially broken away, of a pocket with captions superimposed thereon to indicate that the vertical outboard edge surface initially has a small draft due to cast tooling requirements.

FIG. 1a is a perspective, photorealistic view of an overrunning pocket plate or member, generally indicated at 10, of a one-way clutch or coupling assembly (not shown) constructed in accordance with at least one embodiment of the present invention. FIG. 1b is an enlarged perspective photorealistic view, partially broken away, taken within the circle labeled 1b in FIG. 1a. The plate 10 includes a plurality of pockets or recesses, generally indicated at 12, circumferentially spaced about a rotary axis 14 or centerline of rotation (FIGS. 3 and 5b) within a radially extending face or surface 16 of the pocket plate 10. The pockets 12 are sized and shaped to permit them to be die cast in a liquid metal, permanent mold, die-casting process. The plate 10 has an inner axially extending surface 18 at a pocket plate inner diameter (FIG. 3) on which splines 20 are formed for driving engagement with a rotating member (not shown). The plate 10 also has an outer axially extending surface 22 on which splines 24 are formed.

Each of the recesses or pockets 12 is T-shaped and is partially defined by an outboard edge surface 26, an inside corner surface 28, a head edge surface 30, an inboard edge surface 32 and an inner recess 34.

The one-piece pocket plate 10 is preferably formed as a unitary die casting from a non-ferrous casting alloy such as an aluminum silicon (Al—Si) die-casting alloy. The aluminum is strengthened by silicon and may also be strengthened by one or more of the following alloying elements: Cu, Mg, Ni and Zn. For example, the material may be an aluminum alloy 380 or 390 casting material. However, it is to be understood that other non-ferrous die-casting alloys may be used in forming the pocket plate 10 in a die-casting process.

FIG. 2 is a metallographic sectional view of an outer surface portion of the cast pocket plate 10 to illustrate the casting microstructure of the solid casted plate 10. During the liquid metal die-casting solidification process for the non-ferrous aluminum silicon alloy, an outer surface, relatively "soft skin" layer 40, forms on a relatively hard base or substrate portion 42 of the pocket plate 10. The layer 40, consequently, forms or defines the surfaces 26, 28, 30 and 32 of the pockets 12, as well as the surfaces 18, 22 and 16 of the pocket plate 10. The composite of the base or substrate layer material 42 has very hard (i.e. Rockwell hardness>60) particles 44 of silicon embedded therein. This is to be contrasted with the layer 40 which is free of primary silicon particles such as the particles 44. In other words, the layer 40 is a substantially silicon-depleted surface layer 40.

FIG. 3 includes a schematic perspective view of a strut or pawl, generally indicated at 48, together with a sectional view of the strut 48 received and nominally retained within one of the pockets 12 of the pocket plate 10. Each of the struts 48 is generally of the type shown in U.S. Pat. No. 6,065,576 to mechanically couple the pocket plate 10 to a notch plate or member (not shown) when the plates attempt to rotate relative to each other in a direction opposite an overrun direction illustrated in FIG. 4a in which the two plates are allowed to overrun relative to each other.

As illustrated in the schematic perspective view in FIG. 3, each strut 48 includes first and second end surfaces, 50 and 52, respectively, and a pair of oppositely projecting ears 54 which extend laterally from the strut 48 proximate from to its first end surface 50. The ears 54 cooperatively engage its respective pocket's complementary inner surfaces including the surfaces 28 and 30 to thereby nominally position a first end of the strut 48 including the first end surface 50 in its respective pocket 12.

Each of the locking formations or notches of the notch plate (not shown) is adapted to receive the free end portion of the strut 48 including the second end surface 52 of the strut 48 when the strut's free end is urged into a notch, for example, by a spring 56 seated beneath each strut 48 in its inner recess 34 of its pocket 12.

Each of the strut end surfaces 50 and 52 preferably include substantially planar sections which are canted to a nominal angle relative to an upper face 58 of the strut 48. The planar sections are substantially parallel to one another. Also, each of the ears 54 has a ramped upper surface 60 to prevent interference with the notch plate. Finally, each of the struts 48 includes spaced apart side surfaces 62.

The sectional view of FIG. 3 provides a dynamic engagement analysis of a strut 48 within its respective pocket 12 wherein various forces acting upon the strut 48 are illustrated and described as follows:

$F_R$=Resultant Strut Force. The force available to push the strut 48 out of its pocket 12 (i.e. resultant force on the strut 48).

$F_S$=Spring Force. The force created by the spring 56 used to push the strut 48 out of its pocket 12 for engagement with the notch plate (not shown).

$F_C$=Centrifugal Force. The effective weight of the strut 48 due to rotation of the pocket plate 10 during operation. (Force of strut 48 against pocket plate wall 26.)

$F_F$=Friction Force. This force is created by the effective weight of the strut 48 (centrifugal force) acting on the pocket plate 10. The higher the rotational speed the larger the friction force. This force prevents the strut 48 from pushing out of its pocket 12.

$F_P$=Strut Pushout Force. The angle of the pocket plate wall 26 causes the strut 48 to push out of the pocket plate 10. This is due to the centrifugal forces created by the rotation of the pocket plate 10.

$F_L$=Fluid Force. This force is created by the effect of the strut 48 displacing transmission fluid when engaging into the notch plate. From empirical data, this force has been shown to have a minimal effect and is ignored.

The pocket plate (i.e. PP) 10 and associated strut 48 of FIG. 3 has particular utility in the following applications:
- PP has high % of continuous over-run and the NP (i.e., notch plate) is grounded (i.e., stationary);
- PP is stationary (i.e., 0 RPM) after lock-up; and
- PP RPM typically varies from 0 to 7000 RPM.

Figure 4A:
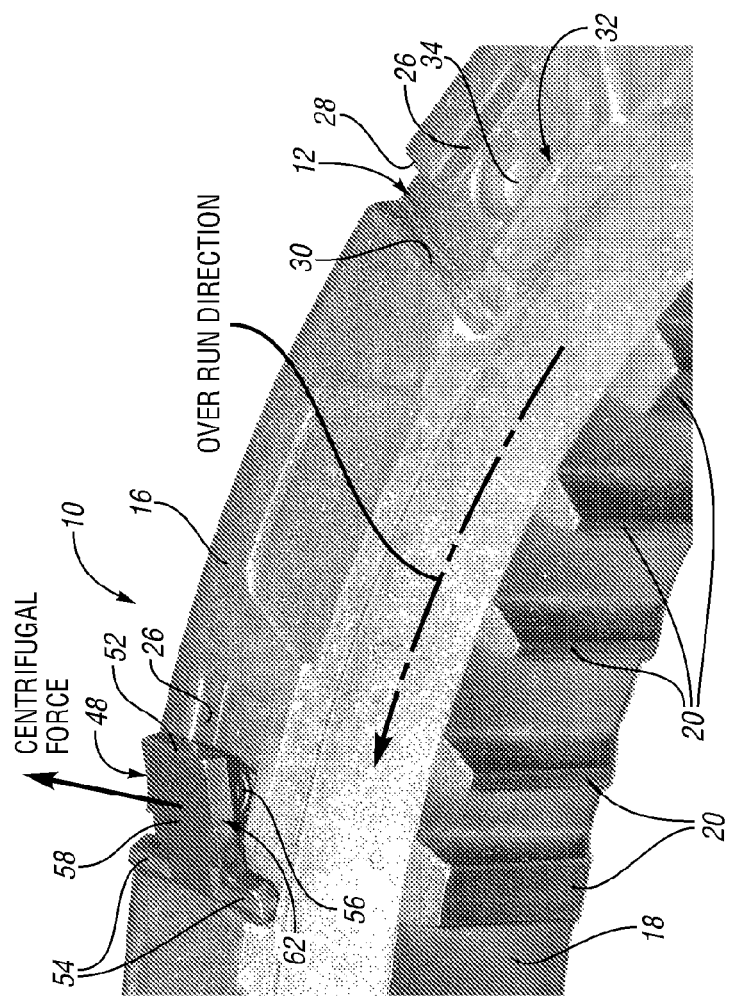
FIG. 4a is a perspective photorealistic view, partially broken away, illustrating an overrun direction of the pocket plate and the resulting centrifugal force operating on the spring-biased strut.

FIG. 4a is a perspective photorealistic view, partially broken away, illustrating an overrun direction of the pocket plate 10 and the resulting centrifugal force operating on the spring-biased strut 48.

FIG. 4b is an enlarged perspective photorealistic view, partially broken away, of a pocket 12 with captions superimposed thereon to indicate that the vertical outboard edge surface 26 initially has a small draft due to cast tooling requirements. Also, the surface 26 is indicated as being worn by an edge of the side edge surface 62 of the strut 48.

FIG. 5a is a view of the pocket plate 10 similar to the view of FIG. 4b.

FIG. 5b is a side schematic view taken along lines 5b-5b of FIG. 5a and illustrating the pocket 12 of the pocket plate 10 wherein the wall or surface 26 of the pocket 12 has an angle (i.e. θ in FIG. 3). The relatively soft surface layer 40 of the wall or surface 26 is effectively machined or abrasively worn due to the up-down motion of the relatively hard strut 48 within the pocket 12 during overrun. The strut 48 moves to the left as indicated by the arrow in FIG. 5b under the centrifugal force to its dashed position wherein a lower edge of one of the side surface 62 of the strut 48 creates a substantially vertical surface out of the previously angled surface 26. In other words, the small amount of draft on the pocket wall or surface 26 is reduced and becomes more vertical with a "step" below the vertical surface 26. The resulting vertical surface 26 ensures that the strut 48 remains stable and is retained in its pocket 12 during overrun conditions. The abrasive wear or machining continues on the sacrificial layer 40 until the lower edge of the side surface 62 of the strut 48 encounters the harder substrate material in the base layer 42.

FIG. 6 is yet another photorealistic view, partially broken away, illustrating: a tooth reaction load on the splines 20 of the pocket plate 10; applied load on the end surface 52 of the strut 48; and a high compressive stress area of the pocket plate 10 caused by the second end surface 50 of the strut 48 in response to the load applied on the first end surface 52 when the strut 48 is performing its locking function with respect to a notch plate. The compressive stress area or head edge 30 of the pocket 12 also experiences polishing type wear due to the up-down motion of the strut 48. Further, the inboard edge or surface 32 experiences less severe wear.

FIG. 7a is a view similar to the view of FIGS. 4b and 5a after the strut 48 has worn the various sacrificial layers defining surfaces 26, 28, 30 and 32 of the pocket 12. FIG. 7b is an electron microscopic image which includes the surfaces 26 and 28 of FIG. 7a. Abrasive wear in each of the surfaces 26 and 28 is evident. FIG. 7c is an enlarged view indicated by the notation "7c" in FIG. 7b wherein wear and a step of apparent deformed metal are shown at the surface 28. FIG. 7d is an enlarged view indicated by the notation "7d" in FIG. 7b wherein wear and a step of apparent deformed metal are shown at the surface 26. Again, the wear and deformation are caused by the up and down motion of the strut 48 when the plate 10 is rotating, thereby causing the strut 48 to move laterally against the surface 26 by centrifugal force.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling member for an engageable coupling assembly, the coupling member being formed as a unitary die-casting from a die-casting alloy strengthened by an alloying material in a die casting process, the coupling member comprising:
   a coupling face having a pocket which is sized and shaped to receive and nominally retain a locking member that moves in the pocket during an overrun condition of the assembly;
   a relatively hard base portion including particles of the strengthening alloying material of the die-casting alloy; and
   a plurality of surface portions which define the pocket wherein at least one generally vertical surface portion of the surface portions is soft relative to the hard base portion and is substantially devoid of the particles of the alloying material so that the at least one generally vertical surface portion wears or deforms during contact of the locking member against the at least one generally vertical surface portion during the overrun condition.

2. The coupling member as claimed in claim 1, wherein the strengthening alloying material includes at least one of elemental Si, Cu, Mg, Ni and Zn.

3. The coupling member as claimed in claim 1, wherein the at least one generally vertical surface portion includes at least one of an outboard edge surface, an inside corner surface, a head edge surface and an inboard edge surface.

4. The coupling member as claimed in claim 1, wherein the wear is at least one of abrasive-type wear and polishing-type wear.

5. The coupling member as claimed in claim 1, wherein the die casting alloy is a non-ferrous alloy.

6. The coupling member as claimed in claim 1, wherein the coupling member is a pocket plate.

7. The coupling member as claimed in claim 1, wherein the locking member is a locking strut.

8. The coupling member as claimed in claim 1, wherein the coupling face is an annular coupling face.

9. The coupling member as claimed in claim 8, wherein the annular coupling face is oriented to face axially along a rotational axis of the assembly.

10. The coupling member as claimed in claim 8 wherein the annular coupling face is oriented to face radially with respect to a rotational axis of the assembly.

11. The coupling member as claimed in claim 1, wherein the coupling face has a plurality of pockets, each of the pockets being sized and shaped to receive and nominally retain a corresponding locking member.

12. The coupling member as claimed in claim 1, wherein the coupling member is a clutch member.

13. The coupling member as claimed in claim 1, wherein the pocket has a T-shape.

14. The coupling member as claimed in claim 1, wherein the pocket has an inner recess for receiving a biasing spring and wherein the pocket is a spring pocket.

15. A pocket plate for a one-way clutch assembly, the pocket plate being formed as a unitary die-casting from a die-casting alloy strengthened by an alloying material in a die casting process, the pocket plate comprising:

an annular coupling face having a pocket which is sized and shaped to receive and nominally retain a locking strut that moves in the pocket during an overrun condition of the assembly;

a relatively hard base portion including particles of the strengthening alloying material of the die-casting alloy; and a plurality of surface portions which define the pocket wherein at least one generally vertical surface portion of the surface portions is soft relative to the hard base portion and is substantially devoid of the particles of the alloying material so that the at least one generally vertical surface portion wears or deforms during contact of the locking strut against the at least one generally vertical surface portion during the overrun condition.

16. The pocket plate as claimed in claim 15, wherein the strengthening alloying material includes at least one of elemental Si, Cu, Mg, Ni and Zn.

17. The pocket plate as claimed in claim 15, wherein the at least one generally vertical surface portion includes at least one of an outboard edge surface, an inside corner surface, a head edge surface and an inboard edge surface.

18. The pocket plate as claimed in claim 15, wherein the wear is at least one of abrasive-type wear and polishing-type wear.

19. The pocket plate as claimed in claim 15, wherein the die casting alloy is non-ferrous.

20. The pocket plate as claimed in claim 15, wherein the coupling face has a plurality of pockets, each of the pockets being sized and shaped to receive and nominally retain a corresponding locking strut.

21. A coupling member for an engageable coupling assembly, the coupling member comprising:

a coupling face having a pocket which is sized and shaped to receive and nominally retain a locking member that moves in the pocket during an overrun condition of the assembly;

a relatively hard base; and a plurality of surface portions which define the pocket wherein at least one generally vertical surface portion of the surface portions is soft relative to the hard base so that the at least one generally vertical surface portion wears or deforms during contact of the locking member against the at least one generally vertical surface portion during the overrun condition.

22. The coupling member as claimed in claim 21, wherein the at least one generally vertical surface portion includes at least one of an outboard edge surface, an inside corner surface, a head edge surface and an inboard edge surface.

23. The coupling member as claimed in claim 21, wherein the wear is at least one of abrasive-type wear and polishing-type wear.

24. The coupling member as claimed in claim 21, wherein the coupling member is a pocket plate.

25. The coupling member as claimed in claim 21, wherein the coupling face is an annular coupling face.

26. The coupling member as claimed in claim 25 wherein the annular coupling face is oriented to face radially with respect to a rotational axis of the assembly.

27. The coupling member as claimed in claim 21, wherein the coupling face has a plurality of pockets, each of the pockets being sized and shaped to receive and nominally retain a corresponding locking member.

28. The coupling member as claimed in claim 21, wherein the coupling member is a clutch member.

29. The coupling member as claimed in claim 21, wherein the pocket has an inner recess for receiving a biasing spring and wherein the pocket is a spring pocket.

30. A pocket plate for a one-way clutch assembly, the pocket plate comprising:

an annular coupling face having a pocket which is sized and shaped to receive and nominally retain a locking member that moves in the pocket during an overrun condition of the assembly;

a relatively hard base; and a plurality of surface portions which define the pocket wherein at least one generally vertical surface portion of the surface portions is soft relative to the hard base so that the at least one generally vertical surface portion wears or deforms during contact of the locking member against the at least one generally vertical surface portion during the overrun condition.

31. The pocket plate as claimed in claim 30, wherein the at least one generally vertical surface portion includes at least one of an outboard edge surface, an inside corner surface, a head edge surface and an inboard edge surface.

32. The pocket plate as claimed in claim 30, wherein the wear is at least one of abrasive-type wear and polishing-type wear.

33. The pocket plate as claimed in claim 30, wherein the coupling face has a plurality of pockets, each of the pockets being sized and shaped to receive and nominally retain a corresponding locking member.

* * * * *